April 14, 1925.
C. E. WHITE
HARVESTING MACHINE
Filed Oct. 14, 1918
1,533,359
4 Sheets-Sheet 1
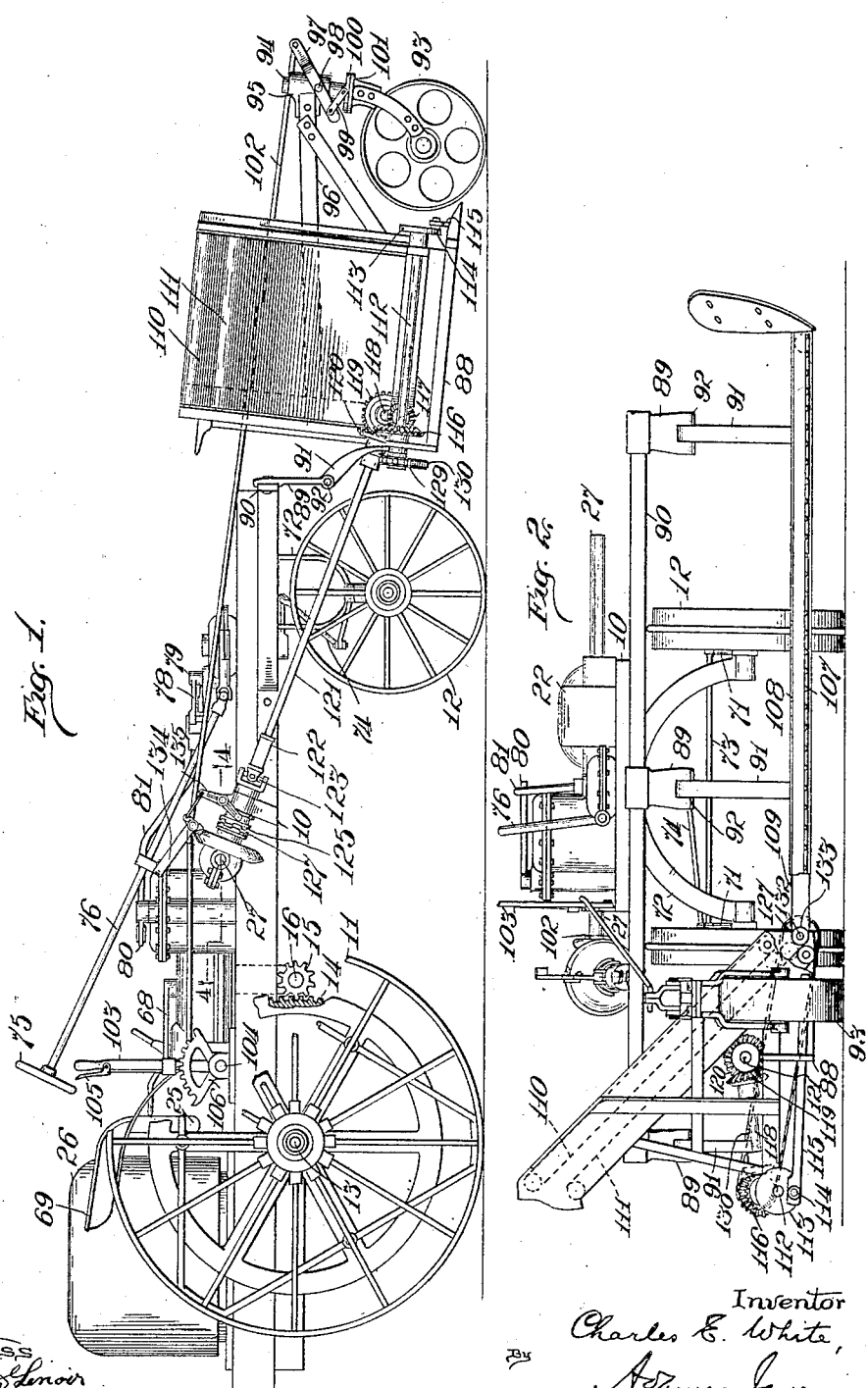
Witness
Fulton Lenoir
Inventor
Charles E. White,
Adams Jackson.
Attorneys

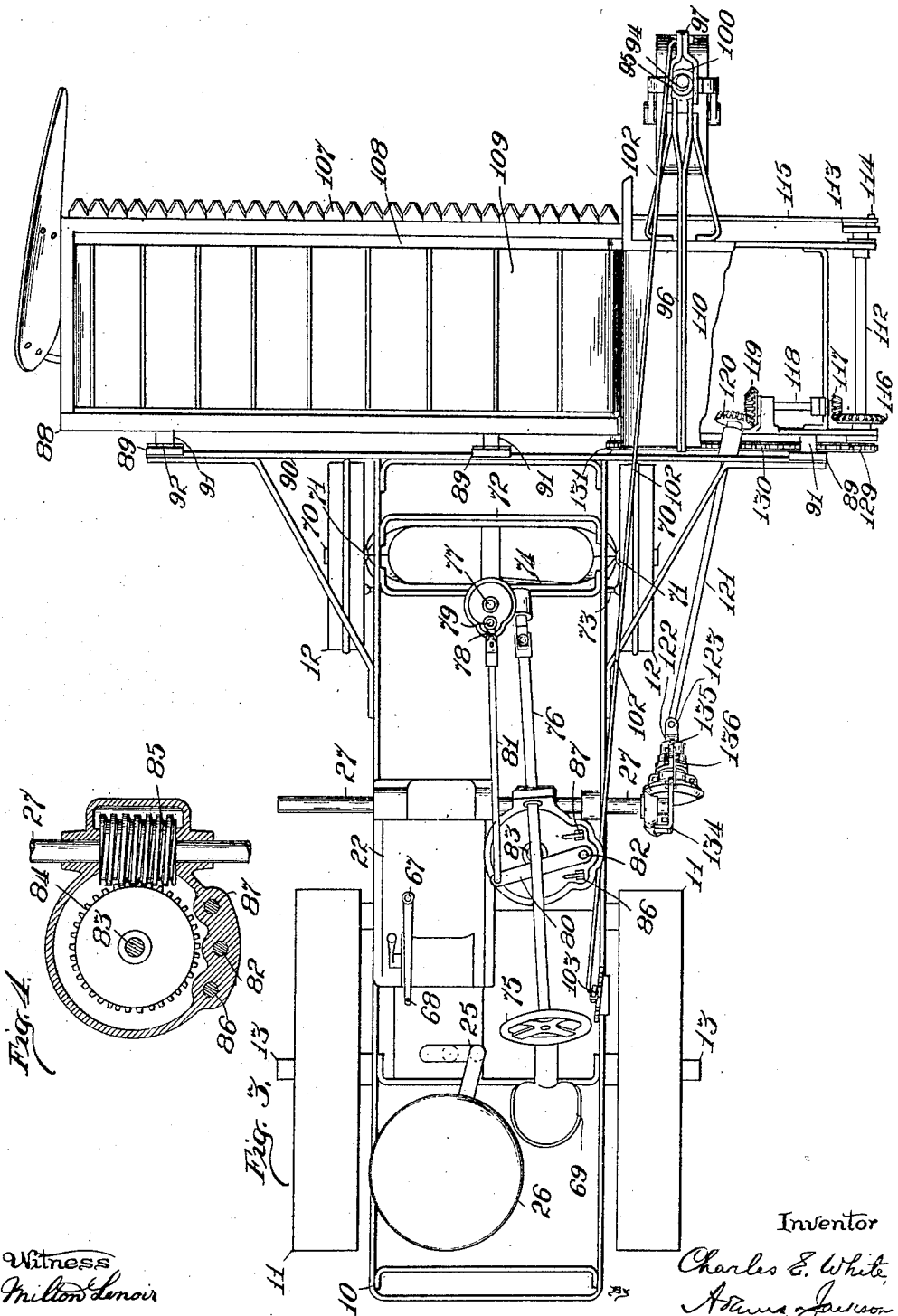

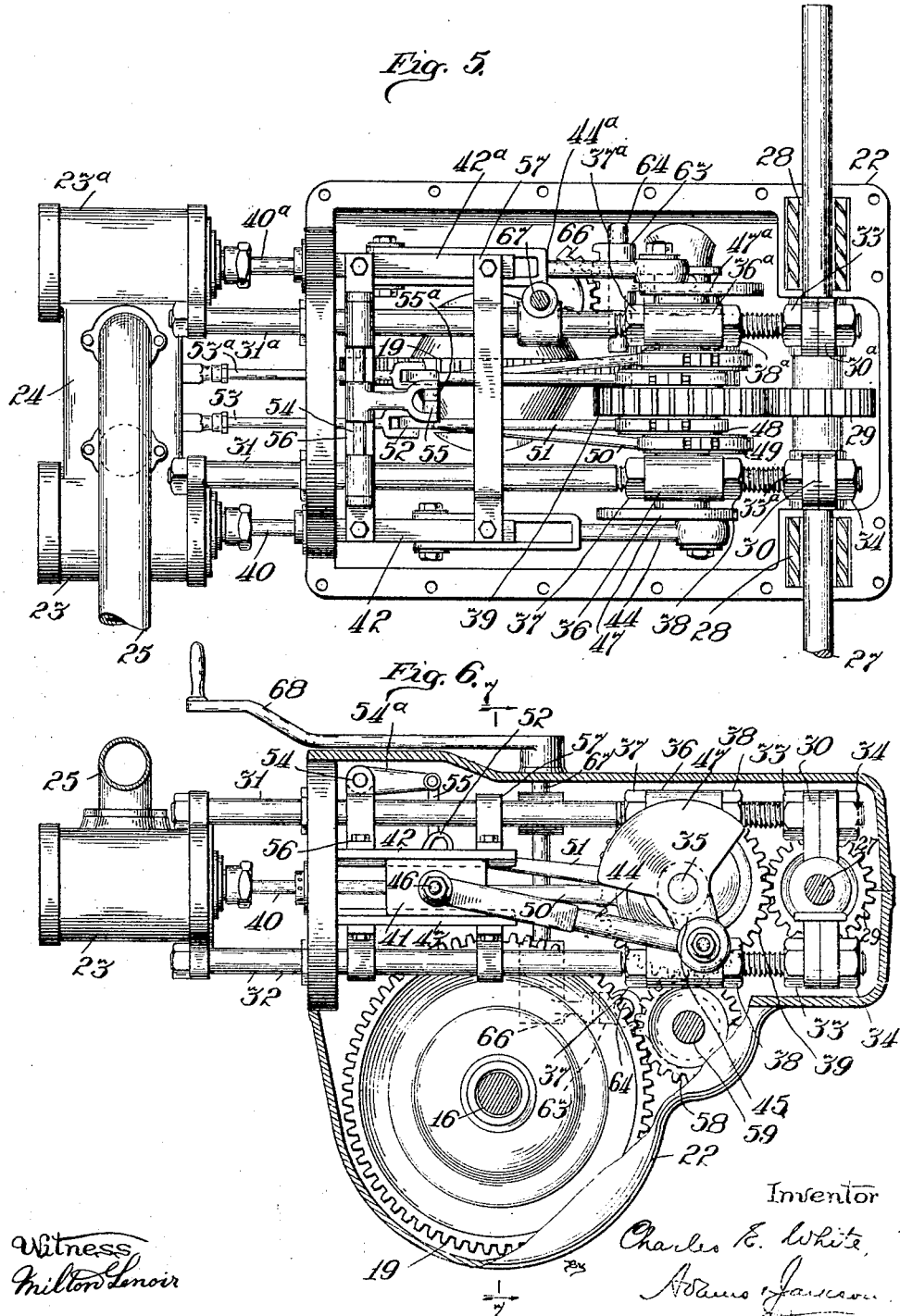

April 14, 1925.　　　C. E. WHITE　　　1,533,359
HARVESTING MACHINE
Filed Oct. 14, 1918　　　4 Sheets-Sheet 4
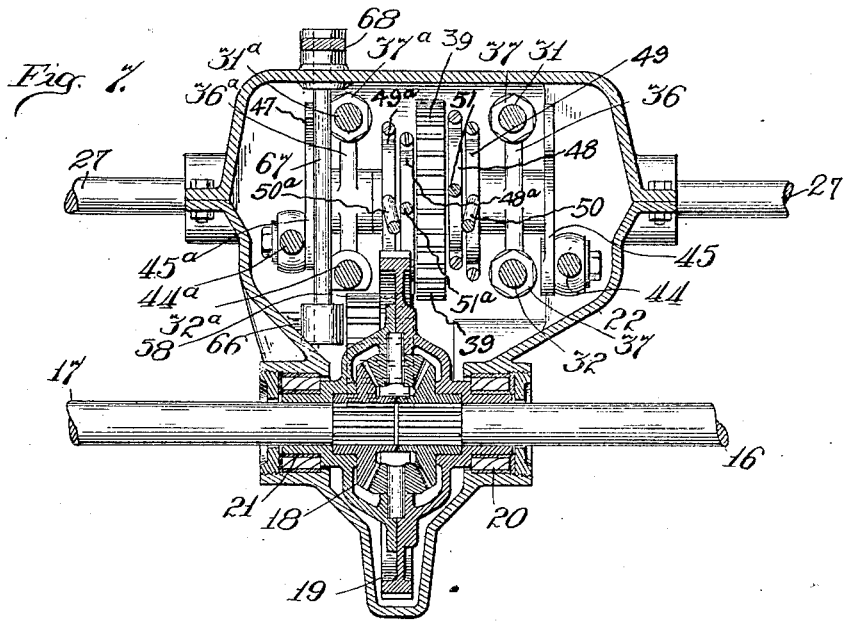
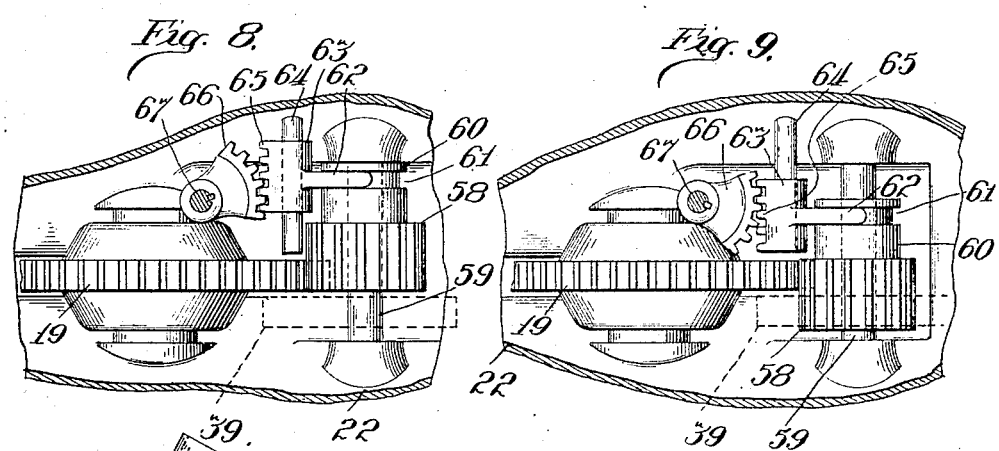
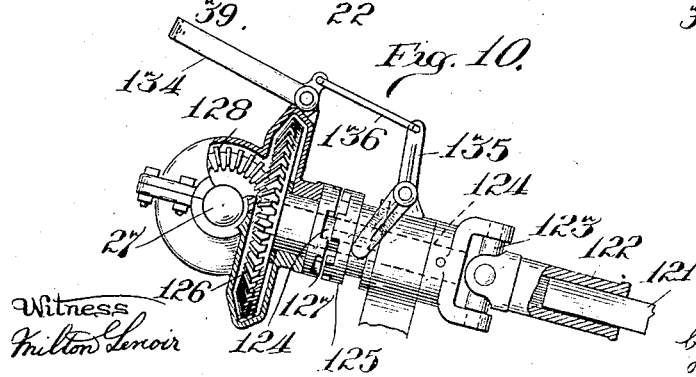

Patented Apr. 14, 1925.

1,533,359

UNITED STATES PATENT OFFICE.

CHARLES E. WHITE, OF MOLINE, ILLINOIS.

HARVESTING MACHINE.

Application filed October 14, 1918. Serial No. 258,007.

*To all whom it may concern:*

Be it known that I, CHARLES E. WHITE, a citizen of the United States, and a resident of Moline, in the county of Rock Island and State of Illinois, have invented certain new and useful Improvements in Harvesting Machines, of which the following is a specification, reference being had to the accompanying drawings.

My invention relates to agricultural implements and has particularly to do with harvesting machinery. It has for its object to provide a new and improved power propelled machine for harvesting grain in which the harvesting mechanism is arranged in advance of the propelling mechanism and of the steering means so that the machine as a whole may be easily guided and controlled; also to provide such a machine in which the steering may be accomplished either by power, by hand or by both means used together; also to provide for driving the harvesting mechanism by power derived from the motor which drives the propelling wheels. In addition to the above-mentioned objects my invention contains certain other improved features which will be hereinafter specifically pointed out.

I accomplish these objects as illustrated in the drawings and as hereinafter described. What I regard as new will be set forth in the claims.

In the accompanying drawings,—

Fig. 1 is a side elevation of my improved machine showing such parts of the harvesting mechanism as are necessary to a full understanding of the invention;

Fig. 2 is a front elevation of the machine, the traction wheels and some of the parts mounted on the rear portion of the machine frame being omitted;

Fig. 3 is a plan view of the parts shown in Fig. 1;

Fig. 4 is an enlarged detail being a partial horizontal section on line 4—4 of Fig. 1;

Fig. 5 is a plan view of the steam engine cylinders and their connections; the upper member of the housing being removed;

Fig. 6 is a side elevation of the parts shown in Fig. 5, the housing being broken away;

Fig. 7 is a vertical section on line 7—7 of Fig. 6;

Figs. 8 and 9 are detailed plan views showing the gear shifting mechanism through which connection is made between the engine and the power shaft from which the harvesting mechanism is driven; and Fig. 10 is a detail, partly in section, showing the clutch mechanism interposed between the power shaft and the harvesting mechanism.

Referring to the drawings,—10 indicates the main frame of the machine which is mounted at the rear on traction wheels 11 and at the front on dirigible wheels 12, as shown in Figs. 1 and 3. The traction wheels 11 are mounted on spindles 13 secured to the main frame 10 in any suitable way, and are provided with gears 14 which mesh with pinions 15 carried by transversely disposed jack-shafts 16—17, as shown in Fig. 7. These jack-shafts are connected at their inner ends with differential gearing 18 which comprises a main driving gear 19 through which the jack-shafts are rotated from the engine hereinafter described. The differential gearing is not described in detail as it may be of any suitable type and in itself forms no part of my present invention. As shown in Fig. 7 the inner ends of the jack-shafts 16—17 are mounted in suitable bearings 20—21 in a housing 22 which encloses the differential mechanism and also certain parts of the engine. This housing with its contents is mounted on the rear portion of the machine frame 10, as shown in Figs. 1 and 3, being located at one side, preferably the left-hand side, of the machine.

The machine illustrated is shown as being equipped with a two cylinder double acting steam engine, and as the parts of the two engine members are duplicates they will be indicated by the same reference numerals but distinguished by the use of the exponent "a." Except as otherwise indicated, therefore, it will be understood that the following description of one of the engine elements applies to both. 23—23ª indicate the two engine cylinders which are best shown in Fig. 5. Said cylinders are in the same horizontal plane and are located immediately in the rear of the housing 22, as shown in said figure, and are connected together by a casing 24 which encloses the usual steam chest and exhaust chamber. 25 indicates a common exhaust pipe which preferably leads to a condenser, not shown. This condenser connects with a boiler 26, shown in Fig. 1, which is located at the rear of the main frame and is suitably connected with the steam chest. The water in the boiler may be heated in any suitable way, as by kerosene burners.

27 indicates a transverse power shaft which is mounted in suitable bearings 28 provided at the front of the housing 22, as shown in Fig. 5, the ends of said shaft projecting beyond the sides of the main frame 10, as shown in Fig. 3. 29 indicates a spur gear mounted upon and keyed to the shaft 27 near the center thereof, as shown in Fig. 5. 30—30ª indicate cross-heads loosely mounted on the shaft 27 at opposite sides of the gear 29. 31—32 indicate upper and lower parallel rods which are connected at their rear ends with the cylinder 23 and at their front ends are adjustably connected with the crosshead 30 by means of nuts 33—34 screwed upon said rods, which are threaded for that purpose, as shown in Figs. 5 and 6. A similar pair of rods is provided at the other side of the engine, said rods being indicated by corresponding numbers with the exponent "a" as hereinbefore explained. These rods serve to support certain parts of the engine mechanism, as will hereinafter appear. 35 indicates a double crank shaft which is mounted in suitable bearings provided in cross-heads 36—36ª mounted on the pairs of rods 31—32 and 31ª—32ª, respectively, said cross-heads being adjustable longitudinally of said rods by means of nuts 37—38, 37ª—38ª shown in said figures. Thus the position of the crank shaft can be adjusted with reference to the transverse shaft 27. 39 indicates a spur gear mounted centrally on the crank-shaft 35 and meshing with the gear 29, as shown in Figs. 5 and 6, so that by rotating said crank-shaft the power shaft 27 is rotated.

40 indicates the piston rod of the cylinder 23, said piston rod being connected with a slide-block 41 which slides in ways 42—43 supported, respectively, by the rods 31—32, as shown in Fig. 6. 44 indicates a pitman, the forward end of which is connected with one of the cranks 45 of the crank-shaft 35, its rear end being forked to embrace the slide-block 41 and being connected therewith by a pivot 46. Thus the reciprocation of the piston 40 rotates the crank-shaft 35. Said crank-shaft is preferably provided with a counterbalance weight 47 opposite the crank 45, as shown in said figure.

48—49 indicate eccentrics mounted on the crank-shaft 35 at one side of the gear 39, as shown in Fig. 5, and connected by eccentric rods 50—51 with a link 52 in the usual way. 53 indicates one of the slide-valve operating rods, the forward end of which is coupled with the link 52 in the ordinary way so that by adjusting the position of the link 52 the cut-off may be regulated. 54 indicates a rock-shaft having an arm 54ª which is connected by links 55—55ª with the links 52—52ª of the two engine members so that by rocking said rock-shaft the position of the links may be adjusted for the purpose stated. This rock-shaft is mounted in suitable bearings in a transverse bar 56 which connects the guideways 42—42ª at the opposite sides of the engine, as shown in Fig. 5. 57 indicates a similar transverse bar which connects the forward portions of said guideways and serves to support and brace the same.

58 indicates a double width pinion which is mounted on a countershaft 59 disposed under the crank-shaft 35, as shown in Fig. 6. Said pinion meshes with the gear 19 and is movable longitudinally upon the shaft 59 into and out of mesh with the gear 39, as indicated by dotted lines in Figs. 8 and 9. Thus by moving the pinion 58 upon its shaft the differential gear 19 may be connected with or disconnected from the gear 39 on the crank-shaft to connect the engine with or disconnect it from the traction wheels. To provide for shifting the pinion 58 upon its shaft it is provided with a collar 60 having a peripheral groove 61 in which fits a fork 62 carried by a sleeve 63 which is mounted to slide upon a transverse shaft 64, as shown in Figs. 8 and 9. Said sleeve is provided at one side with teeth 65 which mesh with the teeth of a segmental rack 66 carried by an upright rod 67 upon the upper end of which is a crank 68, as shown in Fig. 6. It is evident that by operating the crank 68 the pinion 58 may be moved transversely of the machine into or out of mesh with the gear 39 for the purpose described. The crank 68 is conveniently located with reference to the driver's seat 69, as shown in Fig. 3, so that the operator may easily connect the engine with the traction wheels or disconnect them therefrom when he desires to do so.

The front wheels 12 are mounted on spindles 70 provided with vertical pivots 71 journaled at the opposite ends of an arched front axle 72 so that the wheels may swing laterally to guide the machine. Said wheels are connected together, so that they turn in unison, by a cross-rod 73, and are connected to the steering mechanism hereinafter described by a rod 74. Said wheels are arranged to be steered either by power actuated mechanism operated by the steam engine, or by a hand operated steering wheel 75, carried by a steering rod 76, or by both operating together. The mechanism I prefer to employ for this purpose is fully shown and described in Letters Patent No. 1,446,605, granted to me February 27, 1923, and is not illustrated and described in detail in this application as it is not included in the invention herein claimed. In conformity with the disclosure of that patent, the wheels are steered by the rotation in one direction or the other of a shaft 77 shown in Fig. 3, with which the cross rod 74 connects, said shaft being operated by a crank 78 carried by a shaft 79. The crank 78 is actuated in one direction or the other by a lever 80 through a connecting rod 81. The lever 80 is mounted upon a shaft 82 which is actuated to swing the lever 80 back and forth to reciprocate the connecting rod 81 at the proper times by means of suitable connections from a shaft 83 which is driven by means of a worm gear 84 mounted on said shaft and meshing with a worm 85 on the transverse shaft 27, as shown in Fig. 4. The lever 80 may be actuated to steer the front wheels either for a ninety degree or for a reverse turn, these operations being controlled by the operation of one or the other of levers 86—87 shown in Fig. 3. Also the shaft 77 is arranged to be actuated either to turn the machine alternately in opposite directions so that the machine will turn alternately to the right and to the left at opposite ends of the field, or it may be operated to turn always in the same direction so that the machine may be made to travel around the field. The steering rod 76 is connected with the shaft 77 by differential mechanism of any suitable construction, preferably that shown and described in my said Letters Patent, so that the hand steering apparatus may be used either to supplement the power operated steering devices or may be used independently thereof as desired. Any suitable mechanism may be employed for actuating the shaft 82 from the shaft 83, or for appropriately rotating the shaft 77 from the crank shaft 78, and as my present invention is not concerned with the specific construction of such devices they are not shown in detail. An example of mechanism that may well be employed for such purposes is, however, found in my said patent.

88 indicates a harvester frame which is disposed transversely of the machine in advance of the front wheels 12 and is supported from the main frame 10 by brackets 89 which depend from a bar 90 which extends transversely of said main frame at the front end thereof, as shown in Figs. 1 and 2. The harvester frame 88 is provided with upwardly projecting arms 91 which are connected to the brackets 89 by pivots 92, as shown in Fig. 1, so that the harvester frame may swing vertically about said pivots. The harvester frame is supported at the front by a caster wheel 93 having an upwardly projecting stem 94 on which is fitted a sleeve 95 secured to a bracket 96 which projects forwardly from the harvester frame 88 near one end thereof, as shown in Fig. 1. The sleeve 95 is adapted to slide lengthwise of the stem 94 and is adjustably held at different points on said stem by a forked lever 97 pivoted to said sleeve, as shown at 98, and connected near one end by links 99 with a disc 100 adapted to bear upon a flat head 101 at the lower end of the stem 94. Thus by rocking the lever 97 the sleeve 95 may be raised and lowered. The lever 97 is connected by a connecting rod 102 with an adjusting lever 103 mounted on the frame 10 near the driver's seat, as shown in Fig. 1. Said lever is pivoted at 104 and is provided with a latch 105 and a segmental rack 106 for locking it in its different positions of adjustment.

The harvesting mechanism comprises the usual sickle bar 107, platform 108, belt 109 and elevating belts 110—111 arranged so that the grain cut by the sickle bar falls on the belt 109 and is carried up between the belts 110—111. The caster wheel 93 is located at one side of the sickle bar so that it does not run on the uncut grain. The sickle bar 107 is operated from the transverse power shaft 27 by the following connections:—112 indicates a shaft mounted on the harvester frame, as shown in Fig. 3, said shaft being provided with a crank disc 113 having a wrist pin 114 connected by a pitman 115 with the sickle bar in the usual way. The shaft 112 also carries a bevel gear 116 with which meshes a bevel pinion 117 carried by a shaft 118 which also carries a bevel gear 119. The latter bevel gear meshes with a bevel gear 120 secured upon the forward member 121 of a two-part shaft, the members of which are connected by a telescoping joint, as best shown in Fig. 10. The rear member 122 of said shaft is connected by a universal joint 123 with a shaft 124 mounted adjacent to, and perpendicularly to, the axis of the power-shaft 27, as shown in Figs. 1 and 10, and said shaft 124 is provided with a sliding clutch member 125 mounted on a feather thereon so that it rotates with said shaft. Loosely mounted on the rear end of the shaft 124 is a beveled gear 126, the hub of which carries a clutch member 127 which is adapted to mesh with the clutch member 125. (See Fig. 10.) The beveled gear 126 meshes with a beveled pinion 128 mounted on and rotating with the power-shaft 27. Thus when the clutch members 125—127 are engaged the power-shaft drives the shaft members 121—122, thereby rotating the shaft 112 and operating the sickle bar. The several belts 109—110—111 are also driven from the shaft 112, for which purpose said shaft is provided with a sprocket wheel 129 which operates a link belt 130 and through it drives a sprocket wheel 131 mounted on a shaft 132, as shown in Fig. 2. The latter shaft carries a roller 133 which drives the belt 109. Intermediate gears which need not be specifically described connect the shaft 132 with the shafts which carry the belts 110—111, as indicated in Fig. 2. Thus the power shaft 27 operates the conveyor mechanism of the harvesting mechanism as well as the sickle bar through the clutch members 125—127 and their connections. The operating parts of the harvesting mechanism may be disconnected from the power-shaft by moving the clutch member 125 out of engagement with the clutch member 127, for which purpose I provide a lever 134 and a rocking yoke 135 of the usual type, connected by a link 136 with said lever, as shown in Fig. 10. By this construction the power shaft 27 may be driven independently of the harvesting mechanism when desired.

By placing the harvesting mechanism in advance of the tractor element as described the propelling power is applied substantially centrally back of the harvesting mechanism and the operator is given a clear view of the field ahead of the machine. Also the machine may be more easily and quickly steered in either direction. Ordinarily the hand steering wheel is used in tranversing the field, the power operated steering mechanism being employed to make the turns at the ends of the field. The height of the cut may be readily adjusted by operating the lever 103, thereby raising or lowering the sickle bar, this adjustment being permitted by reason of the pivotal mounting of the harvester frame and the telescopic construction of the shaft 121.

While I have shown and described my improved harvesting machine as comprising a steam operated propelling element with steering wheels at the front thereof, I wish it to be understood that my invention, generically considered, is not limited to the use of steam as the motive power, or in all cases to the use of a tractor element having steering means located forward of the propelling means, except as otherwise specifically claimed but includes a propelling and steering element of any other description suitable for the purpose. The claims hereinafter made are therefore to be construed accordingly.

What I claim as my invention and desire to secure by Letters Patent, is—

1. A harvesting machine comprising a tractor frame having propelling means at the rear and dirigible wheels at the front, a transversely disposed power shaft on said frame, a transverse bar secured to the front of said frame, a harvester frame disposed transversely in front of said tractor frame and having upwardly extending arms pivotally connected with said bar, a sickle bar at the front of said harvester frame, a longitudinally extending shaft operatively connected with said sickle bar and with said power shaft, for driving said sickle bar from said power shaft, a caster wheel disposed in front of the harvester frame at one side of said sickle bar, said harvester frame being adjustably supported by said caster wheel, and means operable from the tractor frame for vertically adjusting the harvester frame relatively to said caster wheel.

2. A harvesting machine comprising a tractor frame having propelling means at the rear and dirigible wheels at the front, a transversely disposed power shaft on said frame, a harvester frame disposed transversely in front of said tractor frame and having upwardly extending arms pivotally connected with said tractor frame, a sickle bar at the front of said harvester frame, a substantially horizontal belt carried by said harvester frame back of said sickle bar and movable transversely of the machine, elevating mechanism associated with the inner end portion of said belt, a longitudinally extending extensible shaft operatively connected with said power shaft, connections for driving said sickle bar and said belt from said longitudinally extending shaft, a caster wheel adjacent the inner end of said belt and adjustably supporting the harvester frame, and means operable from the tractor frame for vertically adjusting said harvester frame relatively to said caster wheel to vary the height of the sickle bar from the ground.

3. A harvesting machine comprising a tractor frame having propelling means at the rear and dirigible wheels at the front, a transversely disposed power shaft on said frame, a harvester frame disposed transversely in front of said tractor frame and having upwardly extending arms pivotally connected with said tractor frame, a sickle bar at the front of said harvester frame, a substantially horizontal belt carried by said harvester frame back of said sickle bar and movable transversely of the machine, elevating mechanism associated with the inner end portion of said belt, a longitudinally extending shaft operatively connected with said power shaft, connections for driving said sickle bar and said belt from said longitudinally extending shaft, a caster wheel disposed in front of the harvester frame at one side of said sickle bar, said harvester frame being adjustably supported by said caster wheel, and means operable from the tractor frame for vertically adjusting the harvester frame relatively to said caster wheel.

CHARLES E. WHITE.